(12) United States Patent
Vasseur et al.

(10) Patent No.: US 7,995,461 B2
(45) Date of Patent: Aug. 9, 2011

(54) EFFICIENT CONSTRAINED SHORTEST PATH FIRST OPTIMIZATION TECHNIQUE

(75) Inventors: Jean-Philippe Vasseur, Dunstable, MA (US); Stefano B. Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 1182 days.

(21) Appl. No.: 11/210,910

(22) Filed: Aug. 24, 2005

(65) Prior Publication Data
US 2007/0047469 A1    Mar. 1, 2007

(51) Int. Cl.
H04L 12/26    (2006.01)
H04L 12/28    (2006.01)

(52) U.S. Cl. .................. 370/216; 370/254; 370/401
(58) Field of Classification Search .......... 370/237, 370/238
See application file for complete search history.

(56) References Cited

U.S. PATENT DOCUMENTS

| | | | |
|---|---|---|---|
| 5,606,669 A * | 2/1997 | Bertin et al. ............ | 370/256 |
| 6,262,984 B1 * | 7/2001 | Rochberger .............. | 370/400 |
| 6,304,576 B1 | 10/2001 | Corley et al. | |
| 6,363,319 B1 * | 3/2002 | Hsu ....................... | 701/202 |
| 6,370,119 B1 | 4/2002 | Basso et al. | |
| 6,400,681 B1 | 6/2002 | Bertin et al. | |
| 6,563,798 B1 | 5/2003 | Cheng | |
| 6,600,724 B1 | 7/2003 | Cheng | |
| 6,717,920 B1 | 4/2004 | Cheng | |
| 6,721,269 B2 * | 4/2004 | Cao et al. ............... | 370/227 |
| 6,765,880 B1 | 7/2004 | Hillard et al. | |
| 6,795,425 B1 * | 9/2004 | Raith ..................... | 370/345 |
| 6,801,496 B1 | 10/2004 | Saleh et al. | |
| 6,850,486 B2 | 2/2005 | Saleh et al. | |
| 6,856,627 B2 | 2/2005 | Saleh et al. | |
| 6,898,183 B1 | 5/2005 | Garakani | |
| 6,934,249 B1 | 8/2005 | Bertin et al. | |
| 6,956,821 B2 * | 10/2005 | Szviatovszki et al. ...... | 370/237 |
| 7,301,911 B2 * | 11/2007 | Mack-Crane et al. ...... | 370/400 |
| 7,319,700 B1 * | 1/2008 | Kompella ................ | 370/227 |
| 2001/0033570 A1 * | 10/2001 | Makam et al. ............ | 370/373 |
| 2003/0126287 A1 | 7/2003 | Charny et al. | |
| 2004/0151181 A1 * | 8/2004 | Chu et al. ............... | 370/392 |
| 2005/0083936 A1 | 4/2005 | Ma | |
| 2006/0039391 A1 * | 2/2006 | Vasseur et al. ........... | 370/409 |

OTHER PUBLICATIONS

Rekhter, Y., RFC 1771, entitled A Border Gateway Protocol 4 (BGP-4), Mar. 1995, pp. 1-54.

(Continued)

Primary Examiner — Chirag G Shah
Assistant Examiner — Joshua Smith
(74) Attorney, Agent, or Firm — Cesari and McKenna, LLP (57) ABSTRACT

A technique performs an efficient constrained shortest path first (CSPF) optimization of Traffic Engineering (TE) Label Switched Paths (LSPs) in a computer network. The novel CSPF technique is triggered upon the detection of an event in the computer network that could create a more optimal path, such as, e.g., a new or restored network element or increased path resources. Once the novel CSPF technique is triggered, the computing node (e.g., a head-end node of the TE-LSP or a Path Computation Element, PCE) determines the set of nodes adjacent to the event, and further determines which of those adjacent nodes are within the TE-LSP ("attached nodes"). The computing node performs a CSPF computation rooted at the closest attached node to determine whether a new computed path cost is less than a current path cost (e.g., by a configurable amount), and if so, triggers optimization of the TE-LSP along the new path.

19 Claims, 10 Drawing Sheets

OTHER PUBLICATIONS

Callon, R., RFC 1195, entitled Use of OSI ISIS for routing in TCP/IP and Dual Environments, Dec. 1990, pp. 1-80.

Moy, J., RFC 2328, entitled OSPF Version 2, Apr. 1998, pp. 1-183.

Awduche, D. et al., RFC 3209, entitled RSVP-TE: Extensions to RSVP for LSP Tunnels Dec. 2001, pp. 1-43.

Smit, H., RFC 3784, entitled Intermediate-System-to-Intermediate-System (IS-IS) Extensions for Traffic Engineering (TE), Jun. 2004, pp. 1-13.

Katz, D. et al., RFC 3630, entitled Traffic Engineering (TE) Extensions to OSPF Version 2, Sep. 2003, pp. 1-14.

Braden, R. et al., RFC 2205, entitled Resource ReSerVation Protocol (RSVP), Version 1 Functional Specification, Sep. 1997, pp. 1-112.

Berger, L., RFC 3473, entitled Generalized Multi-Protocol Label Switching (GMPLS) Signaling Resource ReserVation Protocol-Traffic Engineering (RSVP-TE) Extensions, Jan. 2003, pp. 1-40.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

Perlman, Radia, Interconnections Second Edition: Bridges, Routers, Switches, and Internetworking Protocols, Addison Wesley, 1999, Section 12.2.4, pp. 317-319.

Vasseur, J. P., et al., Network Working Group Internet Draft, entitled RSVP Path Computation Request and Reply Messages (draft-vasseur-mpls-computation-rsvp-05.txt), Jul. 2004, pp. 1-31.

Vasseur, J. P., et al., IETF Internet Draft, entitled Path Computation Element (PCE) Communication Protocol, (PCE))—Version 1, (draft-vasseur-pce-pcep-01.txt, pp. 1-43.

\* cited by examiner

EFFICIENT CONSTRAINED SHORTEST PATH FIRST OPTIMIZATION TECHNIQUE

BACKGROUND OF THE INVENTION

1. Field of the Invention

The present invention relates to computer networks and more particularly to constrained shortest path first (CSPF) optimizations of Traffic Engineering (TE) Label Switched Paths (LSPs) in a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, inter-domain routers executing inter-domain routing protocols are used to interconnect nodes of the various ASes. Moreover, it may be desirable to interconnect various ASes that operate under different administrative domains. As used herein, an AS or an area is generally referred to as a "domain," and a router that interconnects different domains together is generally referred to as a "border router."

An example of an inter-domain routing protocol is the Border Gateway Protocol version 4 (BGP), which performs routing between domains (ASes) by exchanging routing and reachability information among neighboring inter-domain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGP-4)*, published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state advertisements or link-state packets (or "IGP Advertisements") for exchanging routing information between interconnected intermediate network nodes (IGP nodes). As used herein, an IGP Advertisement generally describes any message used by an IGP routing protocol for communicating routing information among interconnected IGP nodes, i.e., routers and switches. Operationally, a first IGP node may generate an IGP Advertisement and "flood" (i.e., transmit) the packet over each of its network interfaces coupled to other IGP nodes. Thereafter, a second IGP node may receive the flooded IGP Advertisement and update its routing table based on routing information contained in the received IGP Advertisement. Next, the second IGP node may flood the received IGP Advertisement over each of its network interfaces, except for the interface at which the IGP Advertisement was received. This flooding process may be repeated until each interconnected IGP node has received the IGP Advertisement and updated its local routing table.

In practice, each IGP node typically generates and disseminates an IGP Advertisement whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

As noted, IGP Advertisements are usually flooded until each intermediate network IGP node has received an IGP Advertisement from each of the other interconnected intermediate nodes. Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, "affinities" (administrative constraints to avoid or include certain links), etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. A PCC can be informed of a PCE either by pre-configuration by an administrator, or by a PCE Discovery (PCED) message ("advertisement"), which is sent from the PCE within its area or level or across the entire AS to advertise its services.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205. In the case of traffic engineering applications, RSVP signaling is used to establish a TE-LSP and to convey various TE-LSP attributes to routers, such as border routers, along the TE-LSP obeying the set of required constraints whose path may have been computed by various means.

Occasionally, a network element (e.g., a node or link) will fail (an "event"), causing redirection of the traffic that originally traversed the failed network element to other network elements that bypass the failure. Generally, notice of this failure is relayed to the nodes in the same domain through an advertisement of the new network topology, e.g., an IGP Advertisement, and routing tables are updated to avoid the failure accordingly. Typically, both IP traffic and any TE-LSPs are redirected to avoid a failure in a manner known to those skilled in the art. Once the network element is restored or a new one is added (also an event), a new IGP Advertisement is sent to the surrounding domain so the network can potentially redirect the traffic over the more optimal route (i.e., "re-optimize").

In addition, TE-LSPs typically utilize (reserve) an amount of bandwidth. Because of constraints on the TE-LSP (e.g., required bandwidth), the most optimal path may not be available for a particular TE-LSP, such as when the shortest path has been reserved by other TE-LSPs or other reservation means. Rather than traversing the most optimal path, the TE-LSPs in this case may instead traverse the most optimal path available based on the constraints. For example, the TE-LSP may be established over a non-shortest path that satisfies the required bandwidth constraints (a "sub-optimal" path). This sub-optimal TE-LSP would benefit from re-optimization when there is an increase in available bandwidth over a more optimal link that would meet the constraints in the TE-LSP, thus offering a more optimal (shortest) path. There are also occasions when outstanding requests for TE-LSPs may not be satisfied based on constraints within the request (e.g., there are no available paths that meet the constraints). If a head-end node cannot establish a TE-LSP, it may be configured to wait until the network topology supports the constraints (e.g., when an increase in available bandwidth frees the required bandwidth for the TE-LSP). At that time, the head-end node may again request that the TE-LSP be established over a path that satisfies the constraints. Notably, establishing a new TE-LSP and re-optimizing an established TE-LSP are generally referred to herein as "optimizing" a TE-LSP.

In MPLS TE networks, several "triggers" (e.g., a timer or an event-driven trigger) can be used to initiate the optimization of a TE-LSP. The timer-based approach uses a configurable duration of time between optimizations. This approach is generally sub-optimal because too short of a timer (e.g., every second) results in excessive computation, potentially without any positive outcome, while too long of a timer (e.g., one hour) does not allow for optimization of a TE-LSP as quickly as possible. The event-driven trigger attempts to optimize a TE-LSP when the head-end node receives notification of the event, such as through an IGP Advertisement. A combination of both triggers is a useful approach to balance the known advantages and limitations of each type of trigger.

One problem with TE-LSP optimization is that once triggered on a head-end LSR, the optimization process, e.g., the CSPF path computation, must be triggered for each TE-LSP established by that LSR. In contrast, routing table computation (e.g., IP routing) is typically performed once with one resultant SPF. Consequently, a CSPF computation must be performed for each TE-LSP, which may lead to potentially hundreds of CSPF computations per optimization trigger. Although CSPF computations are generally less resource consuming than an SPF computation for the routing table, the computation of tens or hundreds of CSPFs may place a substantial load on the network. Particularly, many conventional networks currently only utilize long optimization timers, which implies slow optimization, resulting in many TE-LSPs requiring optimization at once. Also, even in networks that utilize an event-driven timer, no check is performed prior to a new CSPF computation to determine whether the event creates an opportunity for optimization.

SUMMARY OF THE INVENTION

The present invention is directed to a technique for performing an efficient constrained shortest path first (CSPF) optimization of Traffic Engineering (TE) Label Switched Paths (LSPs) in a computer network. The novel CSPF technique is triggered upon the detection of an event in the computer network that could create a more optimal path, such as, e.g., a new or restored network element or increased path resources. Once the novel CSPF technique is triggered, the computing node (e.g., a head-end node of the TE-LSP or a Path Computation Element, PCE) determines the set of nodes adjacent to the event, and further determines which of those adjacent nodes are within the TE-LSP ("attached nodes"). The computing node performs a CSPF computation rooted at the closest attached node to determine whether a new computed path cost is less than a current path cost (e.g., by a configurable amount), and if so, triggers optimization of the TE-LSP along the new path.

In accordance with one aspect of the present invention, the computing node learns of an event through conventional notification means, e.g., IGP Advertisements, and evaluates the type of event to determine whether the event may merit triggering an optimization of TE-LSP paths. The computing node then determines whether the event creates an opportunity for a more optimal path, e.g., an event that adds or increases network resources. If a more optimal path may exist, a novel optimization flag is asserted indicating that a more optimal path may be created; otherwise, the optimization flag is deasserted.

In accordance with another aspect of the present invention, the computing node triggers the novel CSPF technique once the optimization flag is asserted, and further evaluates the event to determine whether optimization of each TE-LSP (for which the computing node is the head-end node or PCE) would be worthwhile. To evaluate the optimization of each TE-LSP, the computing node selects a node (the "root node") with the shortest root distance from (i.e., closest to) the head-end node of the TE-LSP that is along the TE-LSP and adjacent to the event. The computing node then performs a CSPF computation rooted at the root node to a tail-end node of the TE-LSP. During the CSPF computation, the computing node compares the cost of the new CSPF computation with the cost of the current TE-LSP, such that once the cost of the computed path exceeds the current path cost (e.g., less a configurable margin), the computing node ceases the CSPF computation. If the new CSPF computation reaches the tail-end node without surpassing the cost of the current path, however, the computing node triggers optimization of the TE-LSP along the newly computed path.

Advantageously, the novel technique performs an efficient CSPF optimization of TE-LSPs in a computer network. By evaluating the optimization potential of events in the network, the inventive technique provides a mechanism for efficiently triggering the optimization of TE-LSPs when an event occurs that could allow for a more optimal path, as opposed to relying on a sub-optimal triggers, e.g., timer-based or general event-based. Further, by computing a CSPF rooted at a node along the TE-LSP adjacent to the event and ceasing computation once a current TE-LSP cost is surpassed, less resources of the computing node are required than would be during a full CSPF optimization computation.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
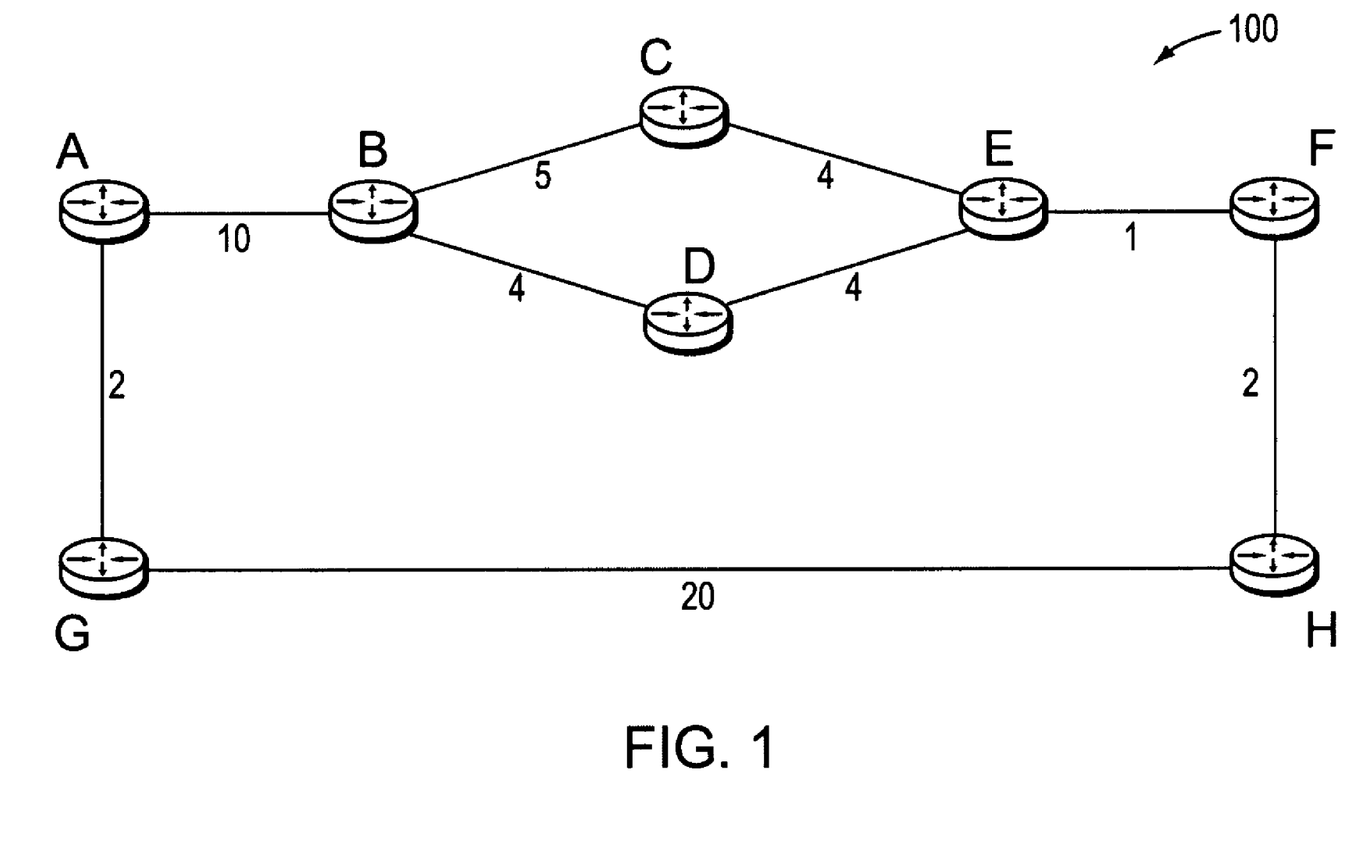
FIG. 1 is a schematic block diagram of an exemplary computer network that may be used in accordance with the present invention.

FIG. 1 is a schematic block diagram of an exemplary computer network 100 comprising routers A-H (e.g., intra-domain routers) interconnected through links as shown. The links between the routers may have an associated metric value (e.g., cost). For example, the cost to reach router B from router A is "10." The cost values of links between other routers of the network 100 are indicated as the numbers shown beneath each link. Network 100 may be contained within a single autonomous system (AS) or area, or may span multiple areas under certain circumstances as will be understood by those skilled in the art. An AS is herein defined to be a group of intermediate nodes, such as interdomain and/or intradomain routers, within a network that are subject to a common authority and execute one or more inter-domain and/or intradomain routing protocols. Although the network 100 is illustratively shown within a single AS, those skilled in the art will appreciate that the network may alternatively be configured as a routing domains or other networks or subnetworks. Notably, any number of nodes or routers may be used in the network 100, and that any number of links may be contained within the network 100 interconnected in various other configurations. These examples are merely representative, and the view shown herein is for simplicity.

Data packets may be exchanged among the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers of the computer network using predetermined Interior Gateway Protocols (IGPs), such as conventional distance-vector protocols or, illustratively, link-state protocols, through the use of IGP Advertisements.

Figure 2:
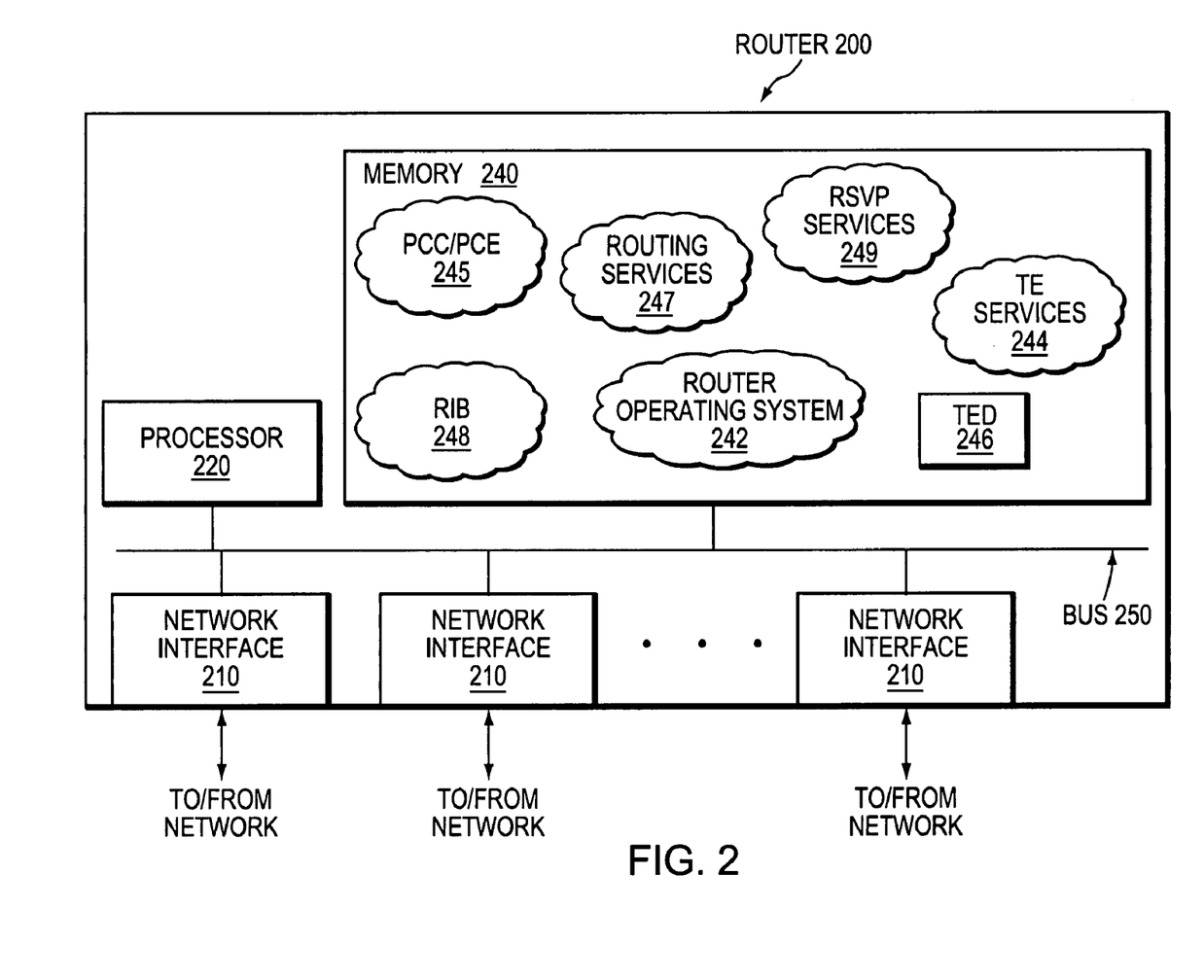
FIG. 2 is schematic block diagram of an exemplary router that may be advantageously used with the present invention.

FIG. 2 is a schematic block diagram of an exemplary router (or node) 200 that may be advantageously used with the present invention. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as Traffic Engineering Database (TED) 246. A router operating system 242, portions of which is typically resident in memory 240 and executed by the processor, functionally organizes the router by, inter alia, invoking network operations in support of software processes and/or services executing on the router. These software processes and/or services include routing services 247, PCC/PCE services 245, Traffic Engineering (TE) services 244, Routing Information Base (RIB) 248, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP, e.g. OSPF and IS-IS. These functions may be configured to manage a forwarding information database (not shown) containing, e.g., data used to make forwarding decisions. Also, RIB 248 may operate in conjunction with routing services 247 to maintain and manage routing tables (not shown) as will be understood by those skilled in the art. RSVP services 249 contain computer executable instructions for implementing RSVP and processing RSVP messages in accordance with the present invention. RSVP is described in RFC 2205, entitled *Resource ReSerVation Protocol (RSVP)*, and in RFC 3209, entitled *RSVP-TE: Extensions to RSVP for LSP Tunnels*, both as incorporated above.

TE services 244 contain computer executable instructions for operating TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. TED 246 is illustratively resident in memory 240 and used to store TE information provided by the routing protocols, such as IGP and/or RSVP (with TE extensions, e.g., as described herein), including, inter alia, lists as described herein. The TED 246 is illustratively maintained and managed by TE services 244.

Changes in the network topology may be communicated among routers 200 using a link-state protocol, such as the conventional OSPF and IS-IS protocols. Suppose, for example, that a communication link fails within an AS or a cost value associated with a network node changes. Once the change in the network's state is detected by one of the routers, that router may flood an IGP Advertisement communicating the change to the other routers in the AS. In this manner, each of the routers eventually "converges" to an identical view of the network topology.

Figure 3:
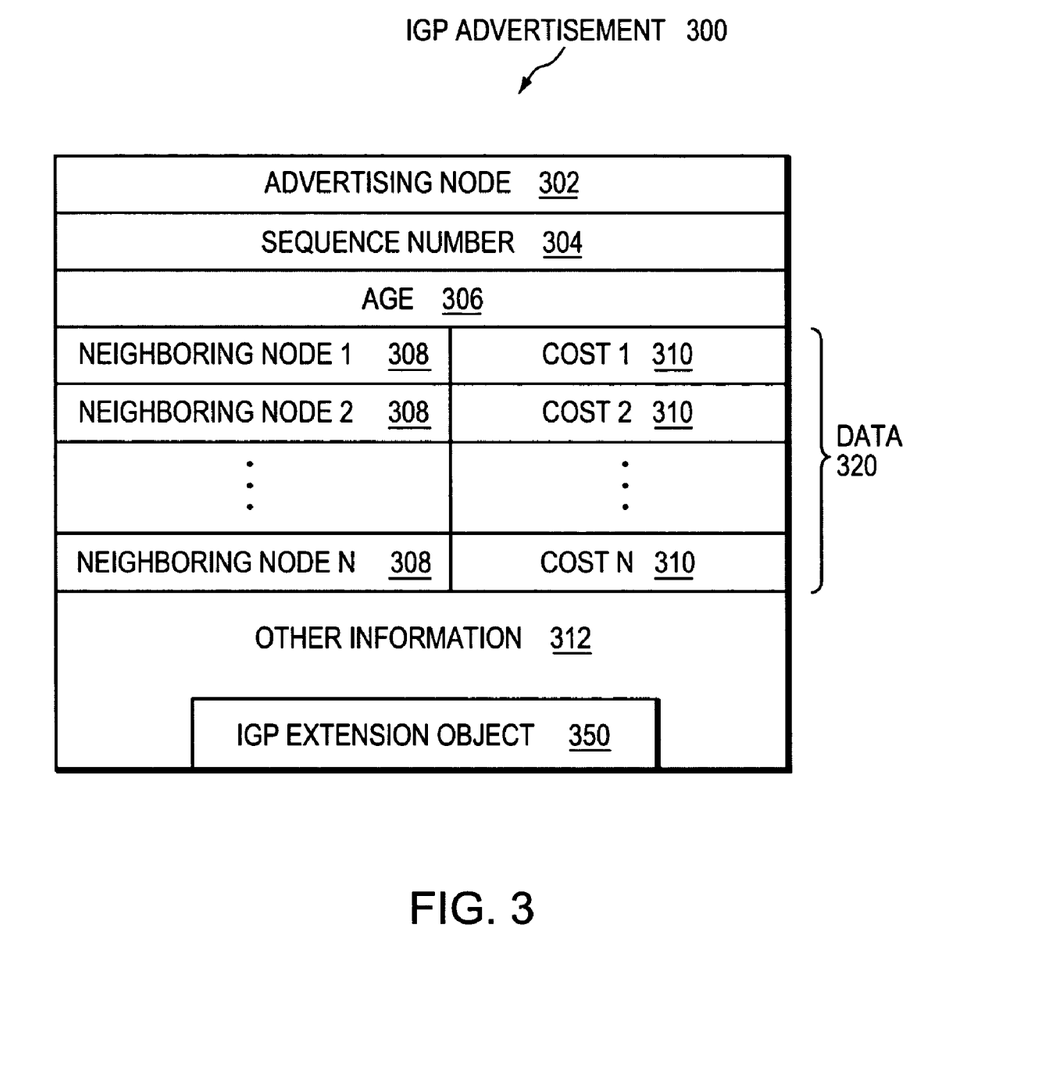
FIG. 3 is a schematic block diagram of an exemplary IGP Advertisement that may be flooded by the routers in accordance with the present invention.

FIG. 3 illustrates an exemplary IGP Advertisement 300 that may be flooded by the routers 200. The packet includes an advertising-node field 302, a sequence-number field 304, an age field 306, a data section 320, and other routing information 312. The advertising-node field 302 stores a value that identifies the router that generated and originally broadcast the IGP Advertisement 300. The sequence-number field 304 stores a sequence number indicating the relative version of the IGP Advertisement. Typically, the sequence number stored in the field 304 is incremented, e.g., by one, for every new version of the IGP Advertisement. The IGP Advertisement 300 is therefore considered "stale" (invalid) if its sequence number is less than the sequence number stored in a previously-received version of the IGP Advertisement, i.e., generated by the same advertising node. Accordingly, the routers 200 may be configured to store and forward only the most recent version of an IGP Advertisement, e.g., the version having the largest sequence number.

The age field 306 also stores a value that may be used for determining whether the IGP Advertisement 300 is valid. The age value is typically initialized to a non-zero integer value, often in units of seconds. The age value may be decremented, e.g., by one every second, until the age value reaches zero, thereby indicating that the IGP Advertisement has become invalid. That is, every router 200 that stores or floods the IGP Advertisement 300 continuously ages the packet until the age value equals zero. Those skilled in the art will appreciate that other aging mechanisms alternatively may be used, such as incrementing the IGP Advertisement age value from an initial value, e.g., equal to zero, until the age value reaches a known upper limit.

The data section 320 includes one or more pairs of neighboring-node fields 308 and cost fields 310. Each neighboring-node field 308 stores a value, such as an address, indicating a network node that is directly accessible from the intermediate node stored in the advertising-node field 302. The field 310 stores a cost value that has been associated, e.g., by the advertising node, with the network node identified in the neighboring-node field 308. As shown, each neighboring-node field 308 is associated with only one corresponding cost field 310. However, it is noted that in other embodiments, a single neighboring node may be associated with a plurality of cost values. Other routing information 312 may also be included in the IGP Advertisement 300, such as checksum values, packet-length information, flag values, type-of-service metrics, etc., and/or an IGP Extension Object 350, which may be used to convey user-specified information, as will be understood by those skilled in the art. Generally, the received IGP Advertisements are stored in a Link-State Database (LSDB) of the router 200 (not shown).

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. Establishment of a TE-LSP requires computation of a path, signaling along the path, and modification of forwarding tables along the path. An example TE-LSP, T1, may be seen in FIG. 4A (described below) as the dotted lines and arrows between routers A-F. MPLS TE establishes LSPs that have guaranteed bandwidth under certain conditions. Illustratively, the TE-LSPs may be signaled through the use of the RSVP protocol (with Traffic Engineering extensions), and in particular, RSVP TE signaling messages. Notably, when incorporating the use of PCEs, the path computation request (and response) between PCC and PCE can be exchanged in accordance with a protocol specified in Vasseur, et al. *RSVP Path Computation Request and Reply Messages<draft-vasseur-mpls-computation-rsvp-05.txt>*, Internet Draft, July 2004, or in Vasseur, et al., *Path Computation Element (PCE) communication Protocol (PCEP)— Version 1<draft-vasseur-pce-pcep-01.txt>*, Internet Draft, July 2005, which are hereby incorporated by reference as though fully set forth herein. It should be understood that the use of RSVP or PCEP serves only as an example, and that other communication protocols may be used in accordance with the present invention.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

The present invention is directed to a technique for performing an efficient constrained shortest path first (CSPF) optimization of TE-LSPs in a computer network. The novel CSPF technique is triggered upon the detection of an event in the computer network that could create a more optimal path, such as, e.g., a new or restored network element or increased path resources. Once the novel CSPF technique is triggered, the computing node (e.g., a head-end node of the TE-LSP or a PCE) determines the set of nodes adjacent to the event, and further determines which of those adjacent nodes are within the TE-LSP ("attached nodes"). The computing node performs a CSPF computation rooted at the closest attached node to determine whether a new computed path cost is less than a current path cost (e.g., by a configurable amount), and if so, triggers optimization of the TE-LSP along the new path.

In accordance with one aspect of the present invention, the computing node (e.g., router A) learns of an event through conventional notification means, e.g., an IGP Advertisement 300, and evaluates the type of event to determine whether the event may merit triggering an optimization of TE-LSP paths. To evaluate the type of event, the computing node first determines whether the event relates to a topology change (e.g., link/node up or link/node down) or a resource change (e.g., bandwidth increase or decrease), e.g., through conventional techniques known to those skilled in the art. The computing node then determines whether the event creates an opportunity for a more optimal path. For instance, if the event is a topology change that adds or restores a link or node (link/node up) or a resource change that increases bandwidth, a novel optimization flag is asserted ("TRUE") indicating that a more optimal path may be created. Additionally, a notification for increase in bandwidth may further contain an indication of a preemption level of the increased bandwidth, as will be understood by those skilled in the art. If, on the other hand, the event does not create an opportunity for a more optimal path, such as a failed or removed link or node (link/node down) or decreased bandwidth, the optimization flag is deasserted ("FALSE"). Notably, the optimization flag may be stored within the memory 240 of the router 200, particularly within the TED 246.

Figure 4A:
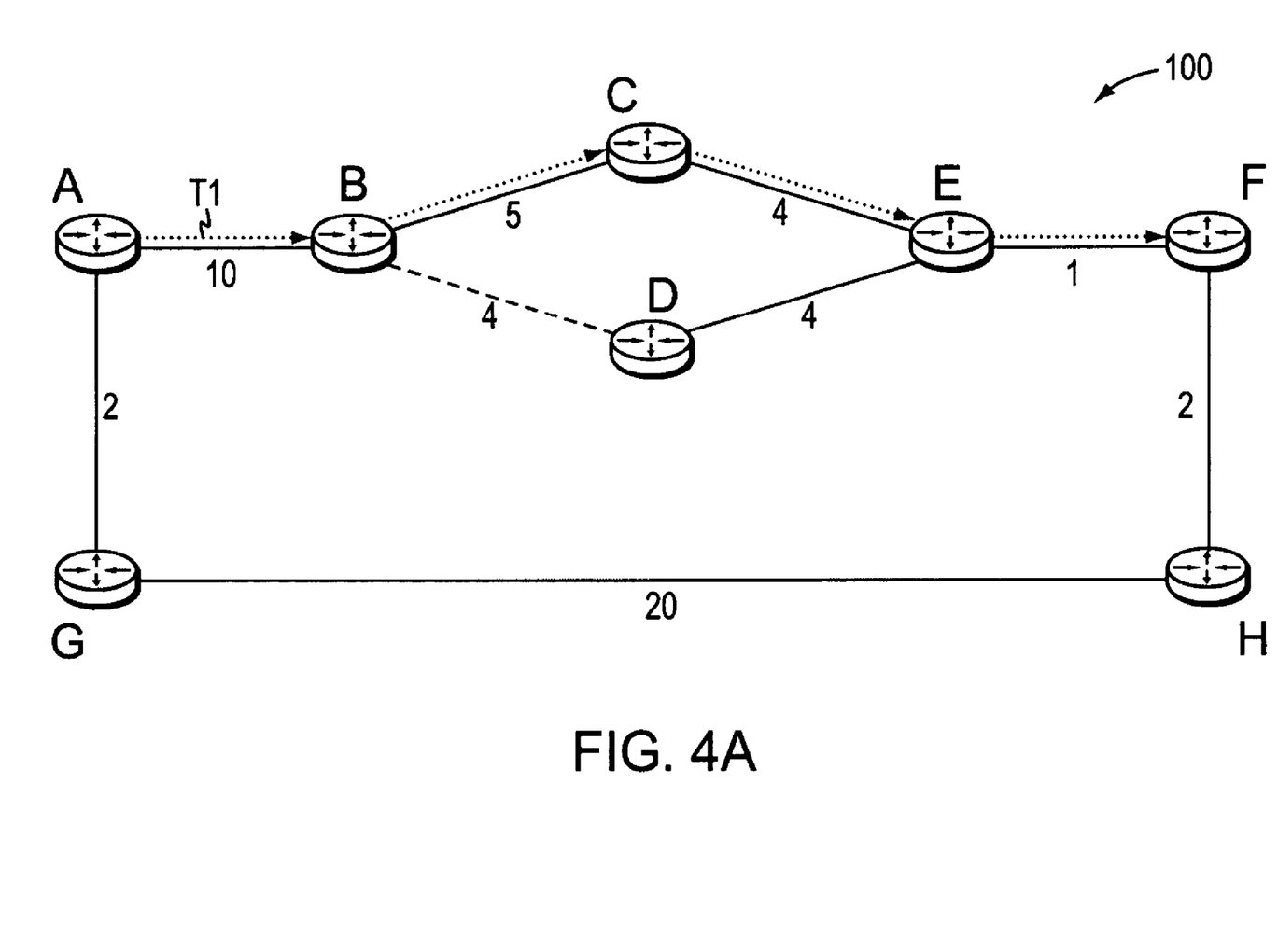
FIG. 4A is a schematic block diagram of an exemplary computer network as in FIG. 1 with an illustrative TE-LSP in accordance with the present invention.
Figure 4B:
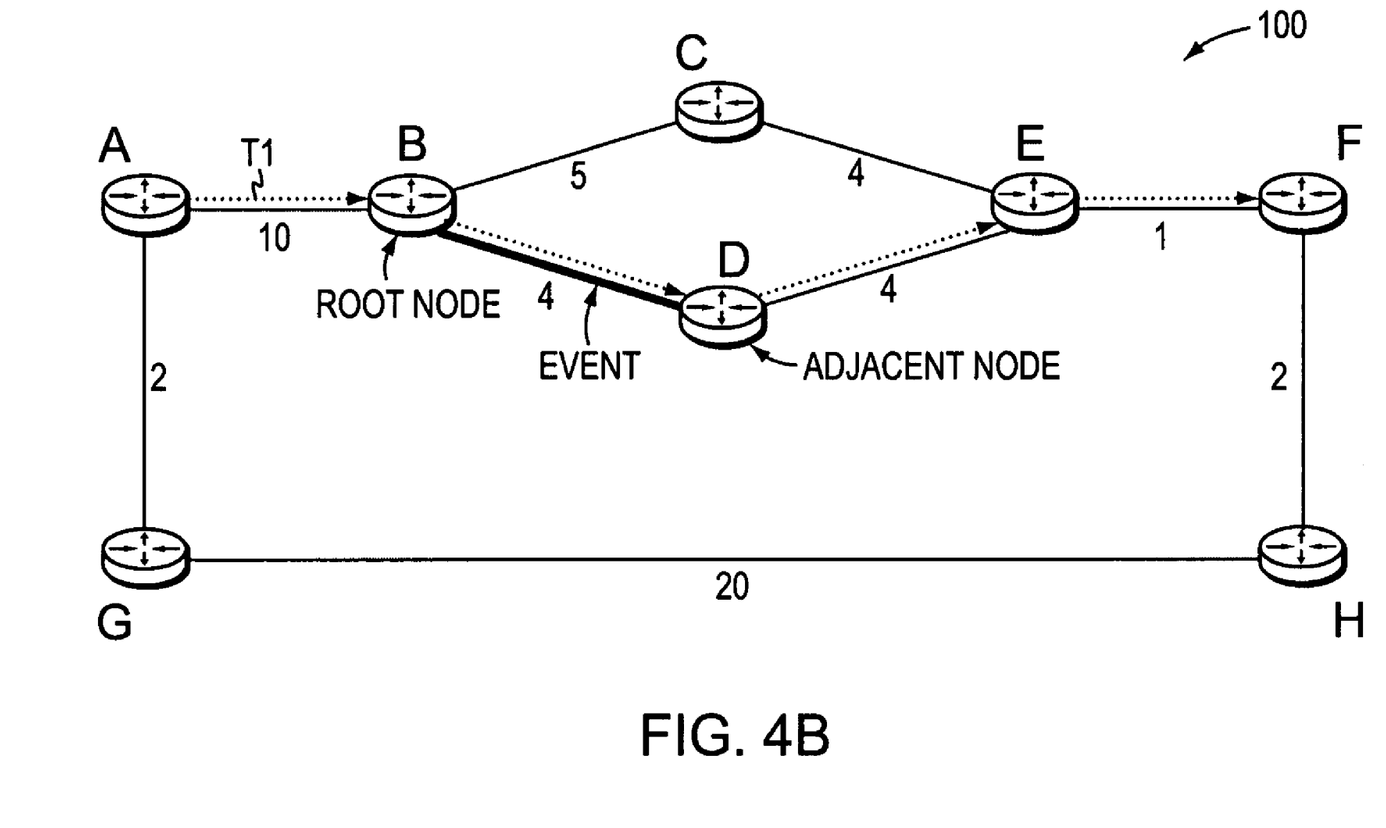
FIG. 4B is a schematic block diagram of an exemplary computer network as in FIG. 4A with an illustrative event and new CSPF computation in accordance with the present invention.
Figure 4C:
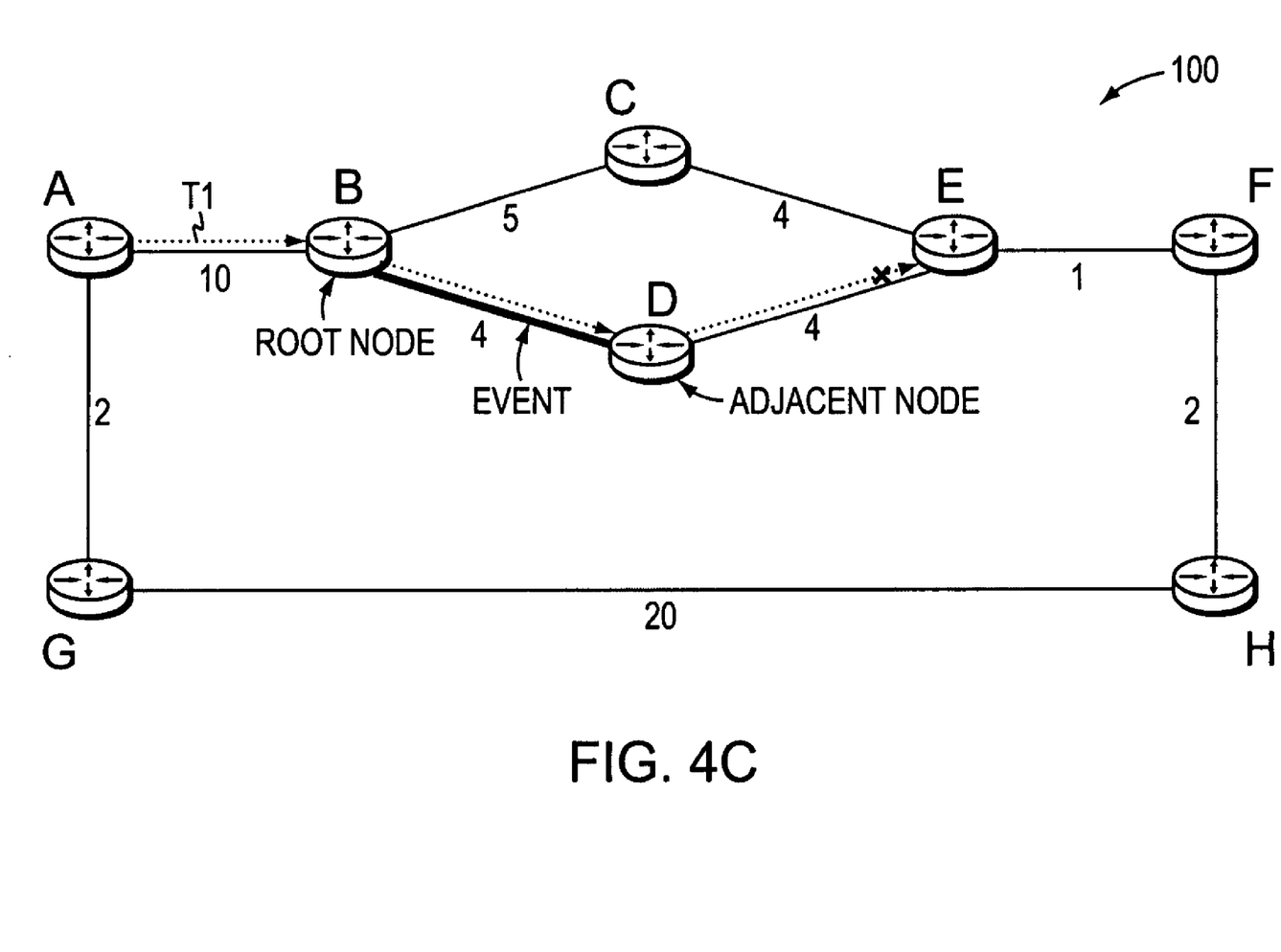
FIG. 4C is a schematic block diagram of an exemplary computer network as in FIG. 4A with an illustrative event and new CSPF computation in accordance with the present invention.

FIGS. 4A-4C are schematic block diagrams of an exemplary computer network as in FIG. 1 with an illustrative TE-LSP, T1 (as shown by the dotted lines and arrows) in accordance with the present invention. Assume in FIG. 4A that the dashed link between routers B and D is unavailable to use (e.g., the link is down or congested or otherwise unavailable for use by T1). As such, T1 follows the path from router B to router E that traverses router C. The resulting cost of the TE-LSP from head-end node router A to tail-end node router F is 20 (i.e., 10+5+4+1). In FIG. 4B, assume that the link resources between router B and router D are increased (e.g., link up or bandwidth increase), in which case the optimization flag is asserted ("TRUE") at the computing node (e.g., router A) after receiving notification of the event (e.g., via IGP advertisement 300), as described above. Note that if the link event were for less resources (e.g., link down or bandwidth decrease), the optimization flag would be de-asserted ("FALSE"). By asserting the flag for events that may create a more optimal path (i.e., new/more resources), the present invention reduces the number of times optimization is triggered over current event-driven (any event) techniques, thereby avoiding unnecessary optimization attempts.

In accordance with another aspect of the present invention, the computing node triggers the novel CSPF technique once the optimization flag is asserted ("TRUE"), and further evaluates the event to determine whether optimization of each TE-LSP (for which the computing node is the head-end node or PCE) would be worthwhile. To evaluate the optimization of each TE-LSP, the computing node first determines the set of nodes adjacent to the node or link that caused the event. From the adjacent nodes, the computing node resolves the set of attached nodes along each particular TE-LSP, and selects the node (the "root node") with the shortest root distance from (i.e., closest to) the head-end node of the TE-LSP. Those skilled in the art will understand that root distance may be measured by a cost metric, a number of hops, or other means to define a relative proximity to the computing node.

Figure 5A:
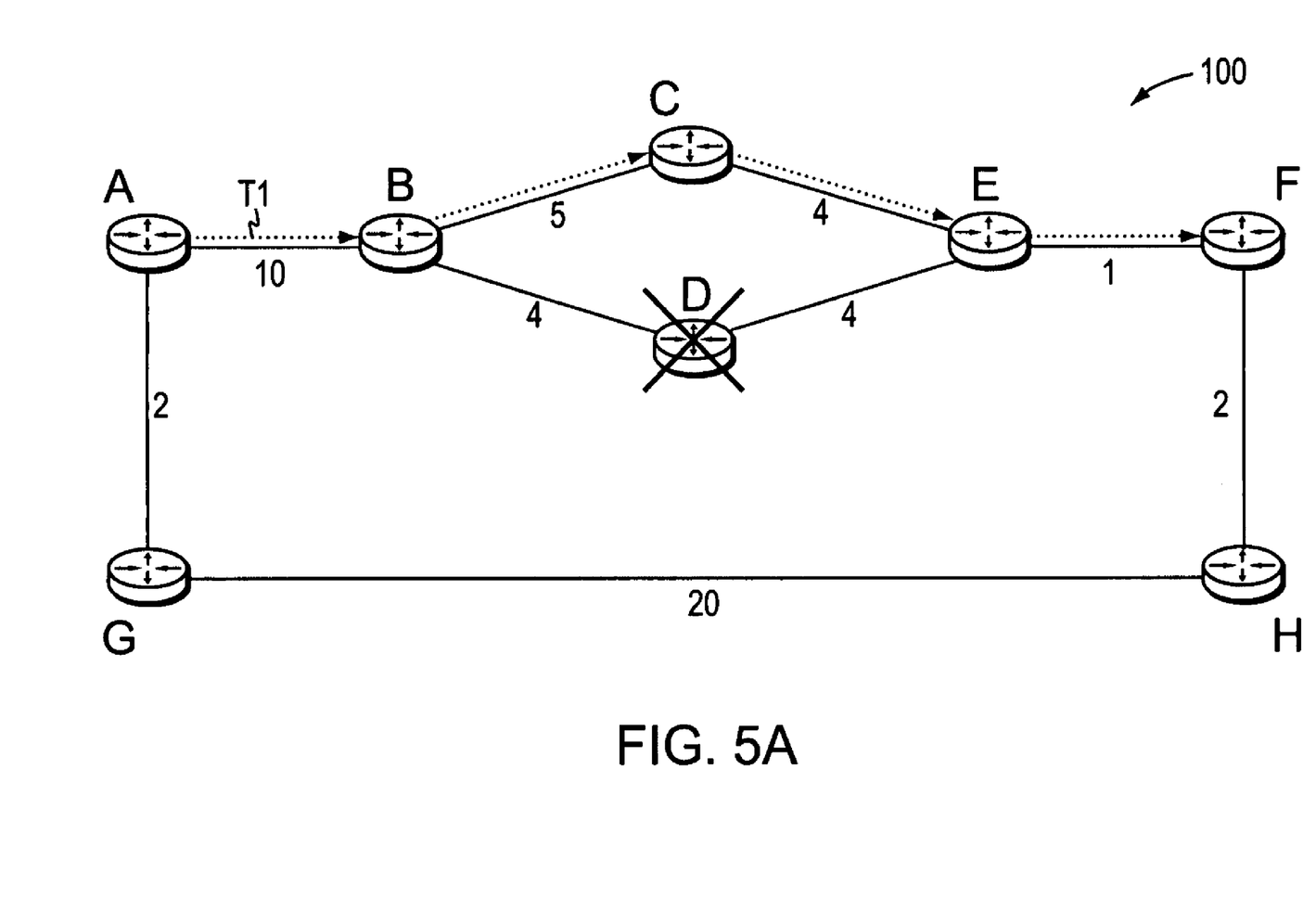
FIG. 5A is a schematic block diagram of an exemplary computer network as in FIG. 1 with an illustrative TE-LSP in accordance with the present invention.
Figure 5B:
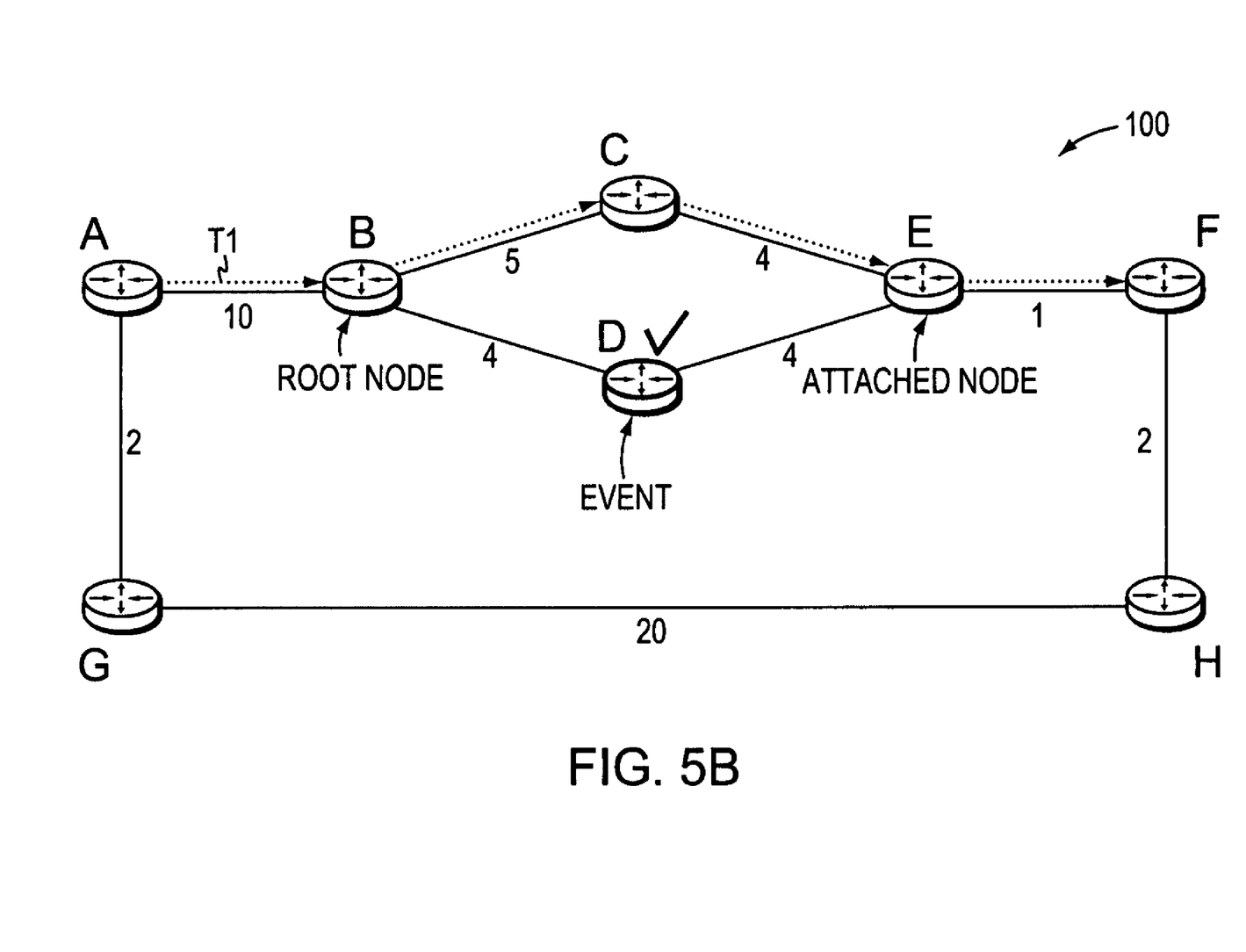
FIG. 5B is a schematic block diagram of an exemplary computer network as in FIG. 5A with an illustrative event in accordance with the present invention.

Again referring to FIG. 4B, while the event occurred on the link between routers B and D, both routers B and D are adjacent nodes to the event. However, because only router B is located along the original TE-LSP T1 (as in FIG. 4A), router B is the only attached node, and hence is selected as the closest root node in accordance with the present invention. Briefly, as a separate example shown in FIGS. 5A and 5B, assume as in FIG. 5A that router D is unavailable (e.g., down). If router D in FIG. 5B becomes available, routers B and E are adjacent to the event, and are both attached nodes (along T1). As such, router B would still be the root node, because it is closer to the head-end node of T1, router A, e.g., a cost of 10 is less than a cost of 19 (or 1 hop is less than 3 hops). Notably, in the event there are no attached nodes to the node or link that caused the event for a particular TE-LSP, the computing node may trigger a conventional (i.e., full) CSPF computation for that TE-LSP. For instance, any TE-LSPs that may traverse the path from router A to router F through routers G and H (not shown) will be optimized using a full conventional CSPF technique, and will not benefit from the more efficient CSPF optimization technique.

To further evaluate the optimization of a TE-LSP, the computing node performs a CSPF computation rooted at the root node to a tail-end node of the TE-LSP, which is added to the cost from the head-end node to the root node. By computing the CSPF from the root node, the CSPF computation requires less time and resources to compute than a full CSPF, and addresses the optimization within the area of the network where the resources may have become available. At each iteration of the CSPF computation, the computing node compares the cost of the new CSPF computation with the cost of the current TE-LSP. If the cost of the computed path at any iteration of the CSPF exceeds the current path cost, no better path is found, and the computing node ceases the CSPF computation. If the new CSPF computation reaches the tail-end node without surpassing the cost of the current path, however, the computing node triggers optimization of the TE-LSP along the newly computed path.

Returning to FIG. 4B, the new CSPF computation illustratively results in a path from router B to router E that traverses router D and that has a lower cost than the original TE-LSP path for T1. Because the cost of the new CSPF computation is lower than the original cost when the CSPF reaches the tail-end node router F, optimization of the TE-LSP T1 is achieved along the new path, and establishment along the new path is subsequently initiated. Notably, a configurable margin (e.g., a percentage or a fixed amount) may be applied at the computing node such that the new cost must be less than the current cost by an amount great enough to merit optimizing the TE-LSP. For example, assume that a 10% margin is applied at the computing node (e.g., router A) for the same example as above in FIG. 4B. Now, as shown in FIG. 4C, once the CSPF computation (rooted at root node, router B), plus the cost to reach the root node from the head-end node, surpasses the current cost of the TE-LSP, the CSPF computation is stopped. For example, because 10+4+4 equals 18, which is equal to only 10% less than the original cost, 20, the CSPF computation is stopped upon the iteration that reaches router E. Even though the final cost of the new CSPF computation would have been 19 in this case (which is less than 20), the computing node may be configured to abandon optimization if the benefit is outweighed by the burden of optimizing a currently-established TE-LSP, as will be understood by those skilled in the art.

The computing node may be further configured such that in the event a large number (e.g., a configurable threshold) of TE-LSPs traverse the root node, the efficient CSPF optimization technique may be abandoned in favor of the conventional full CSPF optimization. For instance, the threshold may be configured as a percentage (e.g., 85%) of the total TE-LSPs (from the head-end node or computed by the PCE) at the root node, or may instead be configured as a specific number, such as, e.g., 1000 TE-LSPs to be computed by the computing node. In this manner, the present invention may be used to save the efficient CSPF optimization algorithm for significant gains, as will be understood by those skilled in the art.

Figure 6:
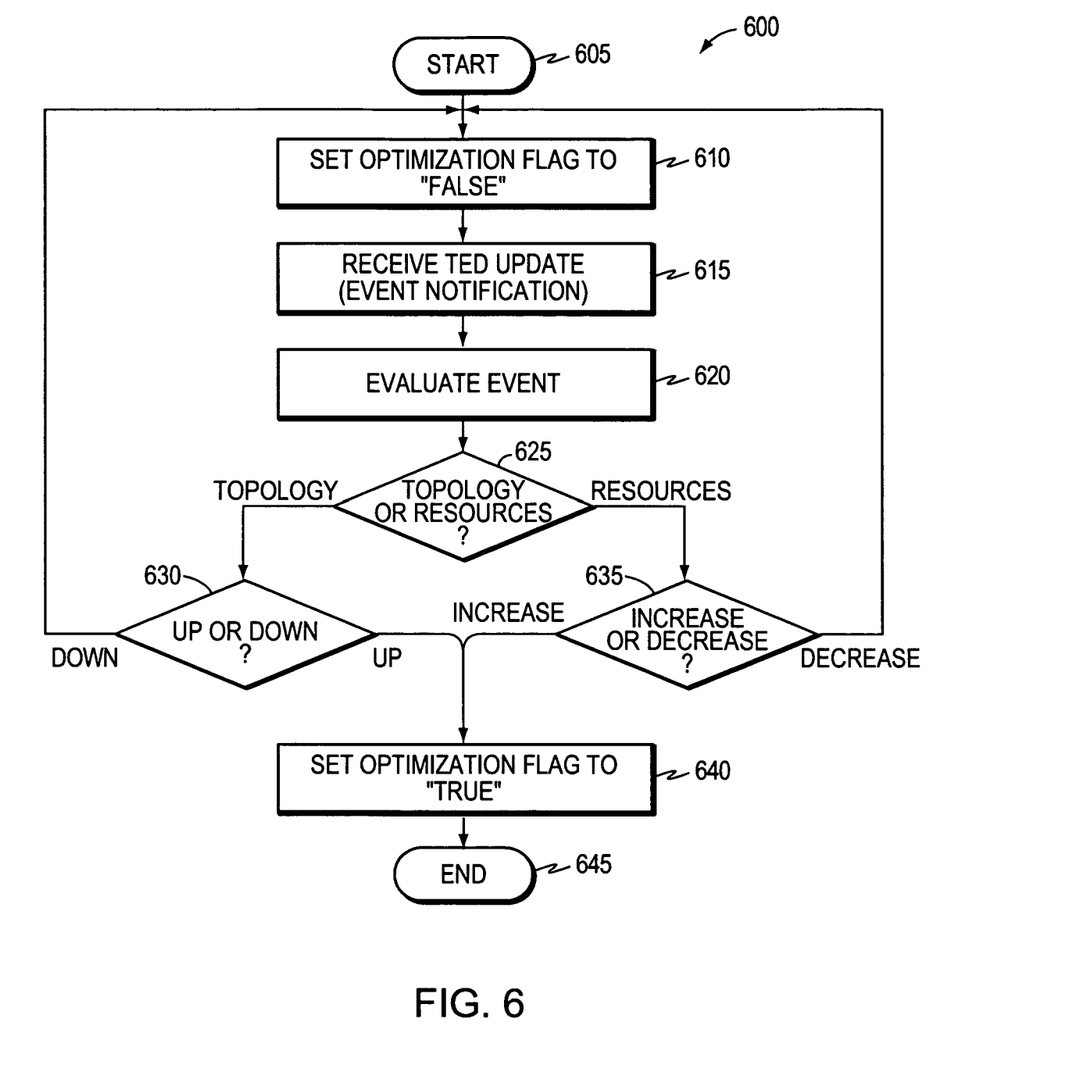
FIG. 6 is a flowchart illustrating a sequence of steps for determining whether a network event could create a more optimal path for one or more TE-LSPs in accordance with the present invention.

FIG. 6 is a flowchart illustrating a sequence of steps for determining whether a network event could create a more optimal path for one or more TE-LSPs in accordance with the present invention. Sequence 600 starts at step 605 and continues to step 610 where the optimization flag (e.g., in the TED) is set to "FALSE" (e.g., de-asserted). At step 615, the computing node (e.g., router A) receives an update to the TED (e.g., via an IGP message) including an event notification. Upon receiving the update, the computing node evaluates the event in step 620, and determines whether the event relates to a topology event or a resource event in step 625. If the event is a topology change, the computing node then determines whether the topology change indicates that a node or link is up or down in step 630. A down node/link results in the sequence 600 returning to step 610 to set the optimization flag to "FALSE," while an up link/node, however, results in setting the optimization flag to "TRUE" (e.g., asserted) in step 640.

The sequence then ends at step 645. On the other hand, if the event is a resource change in step 625, the computing node then determines whether the resource change indicates an increase or decrease in resources (e.g., bandwidth) in step 635. A decrease in resources results in the sequence 600 returning to step 610 to set the optimization flag to "FALSE," while an increase in resources, however, results in setting the optimization flag to "TRUE" (e.g., asserted) in step 640. The sequence then ends at step 645.

Figure 7:
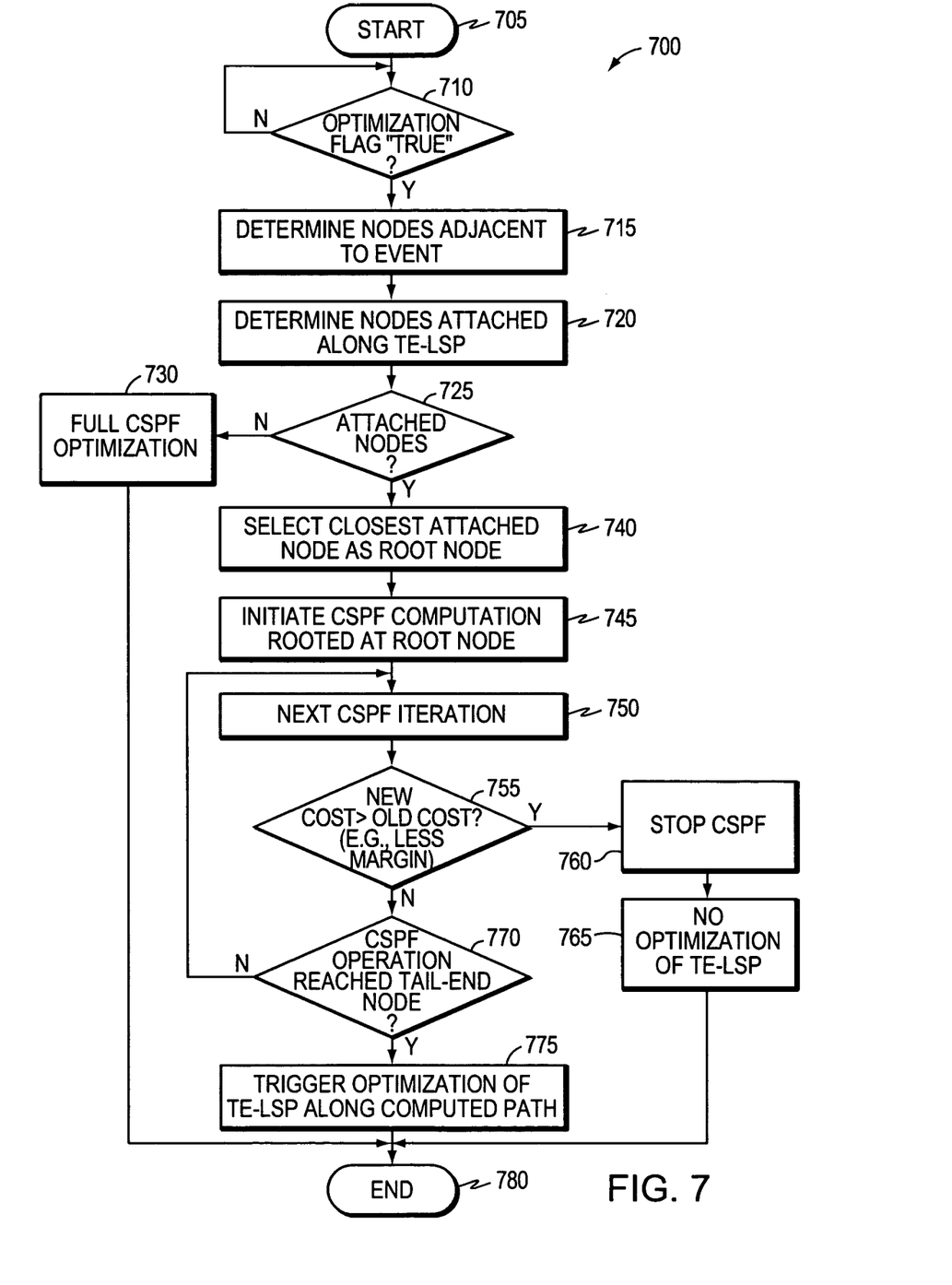
FIG. 7 is a flowchart illustrating a sequence of steps for performing an efficient CSPF optimization of TE-LSPs in accordance with the present invention.

FIG. 7 is a flowchart illustrating a sequence of steps for performing an efficient CSPF optimization of TE-LSPs in accordance with the present invention. Sequence 700 starts at step 705 and continues to step 710 where the optimization flag value is eventually detected as set to "TRUE" (asserted), as described above with reference to FIG. 6. Once the flag is set, the computing node determines the set of nodes that are adjacent to the event at step 715. From the set of adjacent nodes, the computing node further determines the subset of nodes (attached nodes) that are attached along a particular TE-LSP (e.g., T1) in step 720. If there are no attached nodes in step 725, a full CSPF computation may be required in step 730, as described above.

If at step 725 there is at least one node attached along the TE-LSP, the computing node selects the closest attached node as the root node (e.g., router B) in step 740, and initiates a CSPF computation rooted at the root node in step 745. The next (i.e., first) iteration of the CSPF computation is reached in step 750, and the computing node compares the in progress (new) cost of the CSPF computation path (in addition to the cost to the root node) to the old cost of the current TE-LSP path in step 755. As mentioned above, the old cost of the current TE-LSP may be adjusted by the configurable margin, such that only a significant change of cost would result in an optimization of the TE-LSP. If at step 755 the new cost exceeds the old cost, the CSPF computation is stopped in step 760, and at step 765 no optimization of the TE-LSP is performed, and the sequence ends at step 780. Where the new cost has not yet surpassed the old cost in step 755, the sequence continues to step 770 where a determination is made as to whether the CSPF computation has reached the tail-end node of the TE-LSP. If not, the sequence returns to step 750 and 755 until the CSPF computation has reached its last iteration to the tail-end node of the TE-LSP (e.g., router F). If at any point of the CSPF computation the old cost is surpassed, the computation is stopped in step 760. If, however, the CSPF computation reaches the tail-end node of the TE-LSP without surpassing the current cost of the TE-LSP (e.g., less the configurable margin), the computing node triggers the optimization of the TE-LSP along the computed path in step 775. The sequence then ends at step 780.

Advantageously, the novel technique performs an efficient CSPF optimization of TE-LSPs in a computer network. By evaluating the optimization potential of events in the network, the inventive technique provides a mechanism for efficiently triggering the optimization of TE-LSPs when an event occurs that could allow for a more optimal path, as opposed to relying on a sub-optimal triggers, e.g., timer-based or general event-based. Further, by computing a CSPF rooted at a node along the TE-LSP adjacent to the event and ceasing computation once a current TE-LSP cost is surpassed, less resources of the computing node are required than would be during a full CSPF optimization computation.

While there has been shown and described an illustrative embodiment that performs an efficient CSPF optimization of TE-LSPs in a computer network, it is to be understood that various other adaptations and modifications may be made within the spirit and scope of the present invention. Notably, the invention has been shown and described herein using known CSPF computations to compute the shortest path. However, the invention in its broader sense is not so limited, and may, in fact, be used with other shortest path computation techniques. Moreover, while the above description describes performing the technique at the head-end node of the TE-LSP, the invention may also be advantageously used with PCEs computing the paths for the TE-LSPs. In addition, while the invention has been shown and described using IGP messages to transmit event notifications, those skilled in the art will understand that other communication protocols may be used.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for performing an efficient constrained shortest path first (CSPF) optimization of Traffic Engineering (TE) Label Switched Paths (LSPs) in a computer network, the method comprising:
    detecting a topology change in the computer network that adds or restores a link or a node in the computer network, or a resource change in the computer network that increases available bandwidth on a link in the computer network, that could create a more optimal path for TE-LSPs;
    selecting a root node for a CSPF computation based on the root node being adjacent to the topology change or resource change, and based on the root node being located along a particular TE-LSP, wherein the root node is located downstream from a head-end node of the particular TE-LSP; and
    performing the CSPF computation for the particular TE-LSP rooted at the root node;
    applying a configurable margin to the current cost of the particular TE-LSP prior to determining during the CSPF computation if a higher new cost than a current cost of the particular TE-LSP is reached;
    determining during the CSPF computation if a higher new cost than the current cost of the particular TE-LSP is reached; and if so
    stopping the CSPF computation.

2. The method as in claim 1, further comprising:
    determining a set of nodes adjacent to the topology change or resource change in the computer network (adjacent nodes);
    determining a subset of adjacent nodes that are attached along the particular TE-LSP (attached nodes); and
    selecting an attached node that is closest to the head-end node of the particular TE-LSP as the root node.

3. The method as in claim 1, further comprising:
    determining if the CSPF computation has a lower new cost than the current cost of the particular TE-LSP; and if so optimizing the TE-LSP over the path computed by the CSPF computation.

4. The method as in claim 1, further comprising:
detecting the topology change or resource change in the computer network through an Interior Gateway Protocol (IGP) advertisement.

5. The method as in claim 1, further comprising:
asserting an optimization flag in response to detecting the topology change or resource change in the computer network; and
selecting the root node and performing the CSPF computation in response to the asserted optimization flag.

6. The method as in claim 1, further comprising:
configuring a threshold number of TE-LSPs, wherein the steps of selecting the root node and performing the CSPF computation are abandoned in the event the threshold is surpassed by the number of TE-LSPs at the root node.

7. A method comprising:
detecting a topology change in a computer network that adds or restores a link or a node in the computer network, or a resource change that increases available bandwidth on a link in the computer network;
determining a set of nodes adjacent to the topology change in the computer network or resource change in the computer network;
determining a subset of the set of nodes adjacent to the topology change or resource change that are located along a particular Traffic Engineering (TE) Label Switched Path (LSP);
selecting a node of the subset of nodes as a root node;
performing a constrained shortest path first (CSPF) computation for the particular TE-LSP, the CSPF calculation rooted at the root node;
determining if the CSPF computation has a lower new cost than a current cost of the particular TE-LSP; and if so
optimizing the TE-LSP to be over a path computed by the CSPF computation.

8. The method as in claim 7, further comprising:
determining during the CSPF computation that a higher new cost than a current cost of the particular TE-LSP is reached; and if so
stopping the CSPF computation.

9. The method as in claim 7, further comprising:
determining during the CSPF computation that a new cost is within a configurable margin to the current cost of the particular TE-LSP; and if so
stopping the CSPF computation.

10. The method as in claim 7, wherein the detecting the topology change in the computer network or the resource change in the computer network comprises learning of the topology change or resource change through an Interior Gateway Protocol (IGP) advertisement.

11. The method as in claim 7, further comprising:
asserting an optimization flag in response to detecting the topology change in the computer network or the resource change in the computer network; and
selecting the root node and performing the CSPF computation in response to the asserted optimization flag.

12. The method as in claim 7, further comprising:
detecting the topology change or the resource change through an Interior Gateway Protocol (IGP) advertisement.

13. The method as in claim 7, further comprising:
adjusting the current cost of the particular TE-LSP by a configurable margin.

14. An apparatus comprising:
a network interface configured to receive notification of a topology change in a computer network that adds or restores a link or a node in the computer network, or a resource change that increases available bandwidth on a link in the computer network;
a memory configured to store an indication of a set of nodes within the computer network and their locations within the network; and
a processor configured to determine a set of nodes adjacent to the topology change in the computer network or resource change in the computer network, determine a subset of the set of nodes adjacent to the topology change or resource change that are located along a particular Traffic Engineering (TE) Label Switched Path (LSP), select a node of the subset of nodes as a root node, perform a constrained shortest path first (CSPF) computation for the particular TE-LSP, the CSPF calculation rooted at the root node, determine if the CSPF computation has a lower new cost than a current cost of the particular TE-LSP, and if so, optimize the TE-LSP to be over a path computed by the CSPF computation.

15. The apparatus as in claim 14, wherein the processor is further configured to determine during the CSPF computation that a higher new cost than a current cost of the particular TE-LSP is reached, and if so, stop the CSPF computation.

16. The apparatus as in claim 14, wherein the processor is further configured to determine during the CSPF computation that a new cost is within a configurable margin to the current cost of the particular TE-LSP, and if so, stop the CSPF computation.

17. The apparatus as in claim 14, wherein the notification is an Interior Gateway Protocol (IGP) advertisement.

18. The apparatus as in claim 14, wherein the processor is further configured to assert an optimization flag in response to detection of the topology change in the computer network or the resource change in the computer network, and select the root node and perform the CSPF computation in response to the asserted optimization flag.

19. The apparatus as in claim 14, wherein the processor is further configured to adjust the current cost of the particular TE-LSP by a configurable margin.

* * * * *